United States Patent [19]

Munechika et al.

[11] Patent Number: 4,865,450
[45] Date of Patent: Sep. 12, 1989

[54] DUAL PHOTOELASTIC MODULATOR HETERODYNE INTERFEROMETER

[75] Inventors: Stacy M. Munechika, Tucson, Ariz.; Robert M. Heimlich, La Madeia; William E. Stinson, Albuquerque, both of N. Mex.

[73] Assignee: United States of America as represented by Secretary of the Air Force, Washington, D.C.

[21] Appl. No.: 213,008

[22] Filed: Jun. 23, 1988

[51] Int. Cl.$^4$ .............................................. G01B 9/02
[52] U.S. Cl. ..................................... 356/349; 356/351
[58] Field of Search .................... 356/349, 351, 368

[56] References Cited

U.S. PATENT DOCUMENTS 4,340,304 7/1982 Massie ........................... 356/349 X

OTHER PUBLICATIONS

Ueha et al., *Optics Communications*, vol. 23, No. 3, pp. 407–409, Dec. 1977.
Mottier, *Proc. SPIE*, vol. 153, pp. 133–138, Aug. 1978.

*Primary Examiner*—Davis L. Willis
*Assistant Examiner*—Matthew W. Koren
*Attorney, Agent, or Firm*—Richard J. Donahue; Donald J. Singer

[57] ABSTRACT

A heterodyne type interferometer utilizing two optically aligned photoelastic modulators driven at the same frequency and in phase quadrature.

4 Claims, 2 Drawing Sheets

DUAL PHOTOELASTIC MODULATOR HETERODYNE INTERFEROMETER

STATEMENT OF GOVERNMENT INTEREST

The invention described herein may be manufactured and used by or for the Government for governmental purposes without the payment of any royalty thereon.

BACKGROUND OF THE INVENTION

The present invention relates to interferometers, and more particularly to a heterodyne interferometer of improved construction and performance.

Vital to the construction of a heterodyne interferometer is the generation of the frequency or phase shift of one leg with respect to the other in the test and reference legs of the interferometer. The usefulness of such a device is somewhat offset by the difficulty of the critical alignment of the optics associated with producing a beam composed of the two orthogonally polarized components, one of which is frequency shifted with respect to the other.

One of the more common frequency (phase) shifting techniques includes acousto-optic modulators (AOMs) which are similar in principle of operation to moving gratings and Bragg cells. They deflect a light beam at normal incidence to an acoustic sound field at an angle that is proportional to the acoustic frequency. The diffracted light is Doppler-shifted (up or down) by the frequency of the acoustic field. In a generic heterodyne frequency generation configuration, an input beam is split into separate orthogonal polarizations and directed into separate AOMs. One modulator is driven at its center frequency while the other is operating at the center frequency plus some offset. The first diffraction order beams are then recombined and carefully aligned to be colinear. The heterodyne frequency generated is equal to the frequency offset between the two AOMs. The main disadvantage to this technique of generating the heterodyne frequency is the complex alignment techniques associated with splitting, modulating and then recombining the beams from the two AOMs.

Utilizing a rotating halfwave plate as a frequency shifter has been discussed by R. Crane in an article entitled "Interference Phase Measurement", Applied Optics, March 1969, and also by G. Sommargren in an article entitled "Up/down Frequency Shifter for Optical Heterodyne Interferometry", Journal of the Optical Society of America, August 1975. While there are subtle differences between the two configurations, both rely on a rotating halfwave plate to provide a continuous phase shift which results in a translation in frequency equal to twice the rotational frequency. The mechanical action associated with the plate rotation limits the optical frequency shift to about two kilohertz and can create vibrational problems.

It is also known that by displacing a mirror at a constant rate, it is possible to Doppler shift the light reflecting off of the mirror surface. One possible implementation of this concept would involve a mirror mounted on the surface of a piezoelectric translator (PZT) which is driven by a ramp wave. It is not possible to achieve continuous modulation since the PZT would have to be reset at the end of each ramp cycle. The heterodyne frequency would also be limited by the velocity of the mirror as driven by the PZT translator. The mirror could also be dithered sinusoidally but the resulting modulation sidebands would consist of first order Bessel functions, and a pure frequency shift could not be realized.

There have also been devices designed to utilize electrooptic cells, such as Pockels cells or Kerr cells, as phase/frequency modulators. The optical activity of such cells is varied by means of electric fields applied thereto. While many commercial electrooptic cells have very high bandwidths, some in the hundreds of megaHertz, they also have halfwave voltages in the kilovolt range. Thus the performance of such electrooptic cells is limited by the capabilities of the driving source. Pockels cells also have small spatial apertures and collimation requirements that are typically within one degree. If a Pockels cell electrooptic modulator is driven with a sinusoidal signal, the resulting phase modulation will generate unwanted sidebands as in the case of the dithering mirror. An interferometer which uses a pair of aligned Pockels cells or Kerr cells is disclosed in U.S. Pat. No. 4,180,328 issued to L. E. Drain on Dec. 25, 1979.

OBJECTS AND SUMMARY OF THE INVENTION

It is therefore the object of the present invention to overcome the objectionable features of the prior art heterodyne interferometers and to provide a heterodyne interferometer of improved design and performance.

In accordance with the present invention, a heterodyne type interferometer comprises two photoelastic modulators (PEMs) that are driven at the same frequency and in phase quadrature With quarterwave plates positioned at the entrance and exit of the PEMs, the exiting beam will consist of two orthogonal polarizations with one polarization frequency shifted by an amount equal to the PEMs's frequency.

Unlike other heterodyne or fringe scanning interferometers, the device of the present invention relies on a quadrature modulation of two photoelastic modulators which are positioned with their apertures aligned so that the position of the beam entering the PEMs is unaffected as the beam emerges. An incoming laser beam does not have to be split, modulated and then recombined as in conventional heterodyne interferometers using acousto-optic modulators. Thus, the generation of the heterodyne signal can be accomplished without the large number of optics associated with acousto-optic modulators. Furthermore, unlike heterodyne interferometers which rely on mechanically rotating birefringent plates to generate the heterodyne signal and avoid splitting the beam, and can only provide heterodyne frequencies as high as a few kilohertz, the PEM devices used in the present invention have modulation frequencies of about forty kilohertz and they induce no mechanical vibrations into the system.

The foregoing objects and many of the attendant advantages of this invention will be readily appreciated as the invention becomes better understood by reference to the following detailed description when considered in connection with the accompanying drawings.

DETAILED DESCRIPTION OF THE INVENTION

Figure 1:
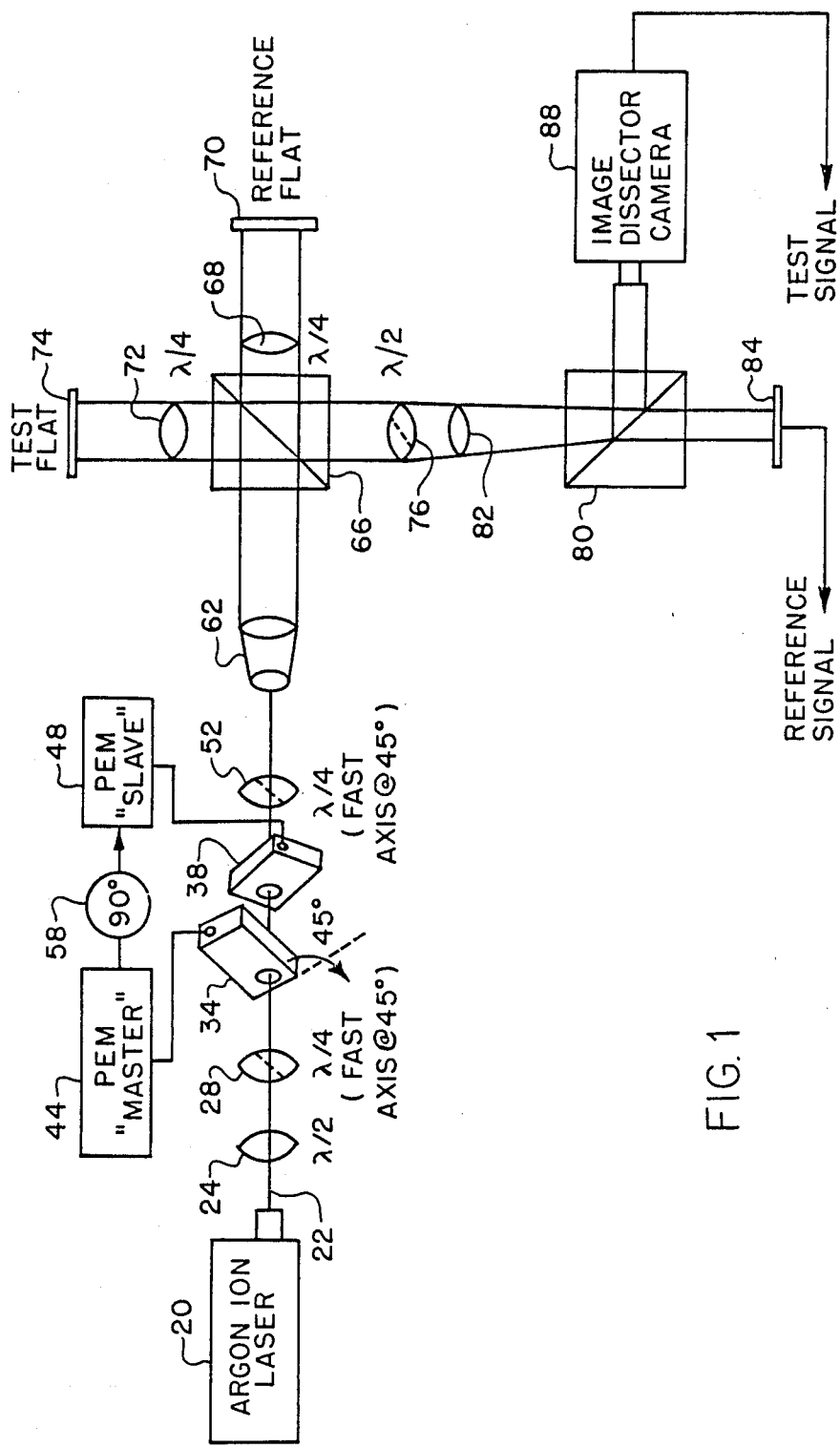
FIG. 1 is an optical schematic diagram of a preferred embodiment of the dual photoelastic modulator heterodyne interferometer of the present invention.

Referring now to FIG. 1 of the drawings, a preferred embodiment of the dual photoelastic modulator heterodyne interferometer of the present invention is seen to comprise a four watt argon ion laser 20 operated at 5145 angstroms, single mode, and used as the input light source. Other visible laser frequencies can be used as long as the transmissive optical components have the appropriate anti-reflective coatings.

The beam 22 emanating from laser 20 is horizontally polarized. Beam 22 passes through a half wave plate 24 and thereafter through a zero order quarterwave plate 28, and thence through the optical heads 34 and 38 associated with a pair of photoelastic modulators 44 and 48 respectively. Beam 22 then passes through a second zero order quarterwave plate 52. Plates 28 and 52 are both oriented with their fast axes at forty five degrees from the horizontal component of beam 22.

The elastooptic effect produced by photoelastic modulators, such as the modulators 44 and 48 used herein, is the change in the reflective index of an optical material in response to a mechanical stress being applied thereto. If the stress applied is anisotropic, birefringence is induced. An oscillating birefringence is established by alternately expanding and compressing an isotropic optical element with quartz piezoelectric transducer that is coupled to one side of the optical element and driven at its resonant frequency.

Photoelastic modulators (PEM's) 44 and 48 are identical devices manufactured by Hinds International Inc., and marketed as their PEM-80 Series II FSA model. The Hinds photoelastic modulator has a modulator head which contains a fused silica optical element with a piezoelectric (PZT) transducer bonded to one side thereof. The quartz PZT transducer is the primary frequency determining element in the oscillator loop. Control lines between the modulator controller and its optical head include a voltage line to drive the PZT transducer and a current feedback line to stabilize the voltage at the desired oscillation amplitude. The optical element operates in the series resonant mode and during oscillation the drive voltage and current to the optical element are in phase.

The Hinds photoelastic modulator provides an adjustable voltage to drive the PZT transducer and optical element in its optical head to the desired optical phase retardation. It also includes amplitude limiting circuitry that will shut down the oscillator circuit to prevent damage to the optical element in the event of voltage overdrive. The front panel of the modulator has TTL compatible reference signals at the modulator reference frequency and also at twice the resonance frequency.

Both photoelastic modulators 44 and 48 have a resonant frequency of 42 kiloHertz. Modulator 44 is termed herein the master modulator, and modulator 48 is termed the slave. Head 34 of master modulator 44 is oriented with its X axis at forty five degrees to the horizontal component of the input laser beam 22. Head 38 of slave modulator 48 is aligned with the horizontal component of the laser beam 22.

A reference signal of eighty four kilohertz obtained from master modulator 44 is divided by two and shifted in phase by phase shifter 58 and then coupled into the head 38 of slave modulator 48. Head 38 is modified as shown in FIG. 2 to receive the reference signal from master modulator 44 such that the two modulators will oscillate with a ninety degree difference, i.e., in phase quadrature.

Figure 2:
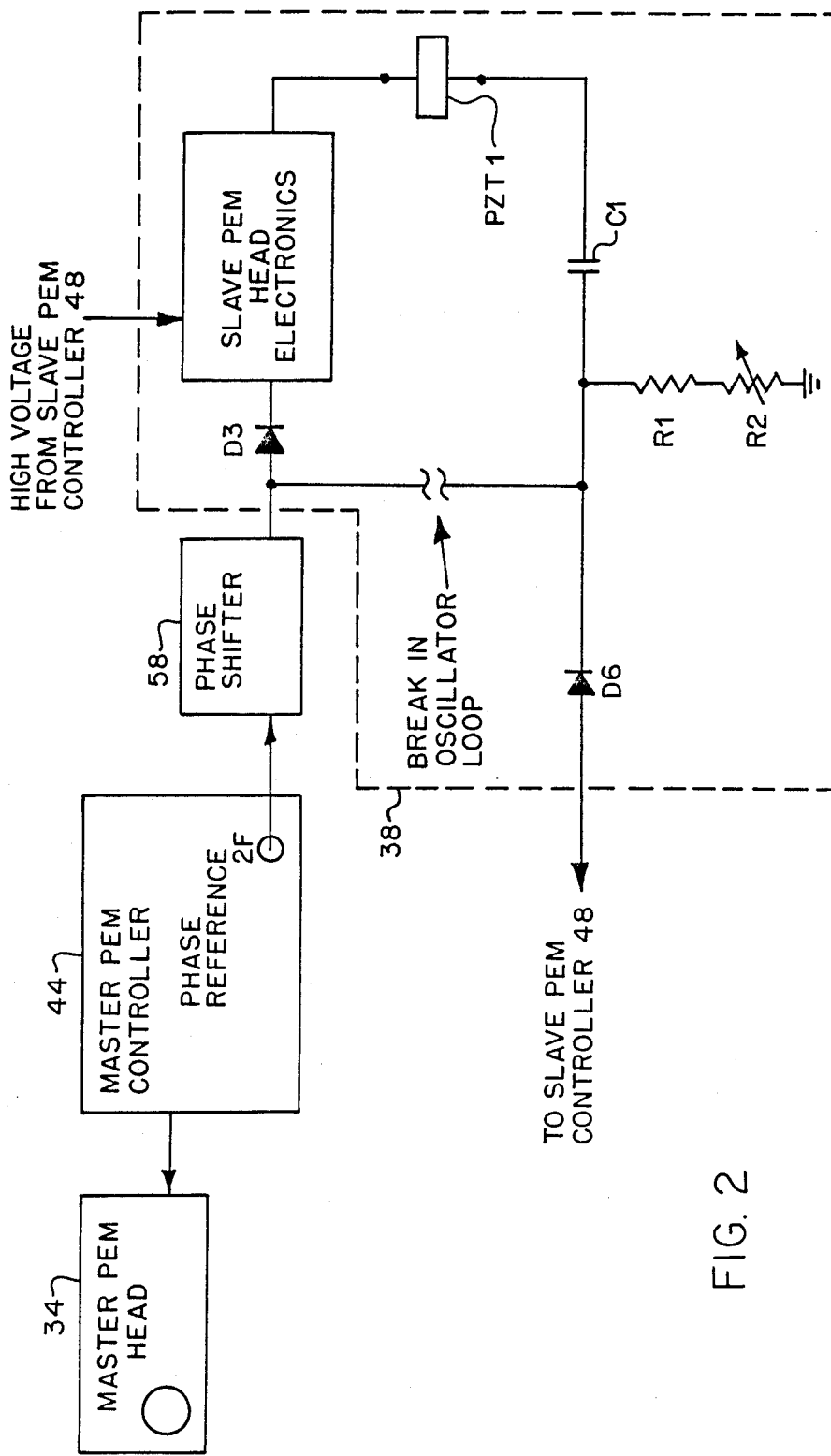
FIG. 2 is a schematic diagram which illustrates the manner of slaving of the second photoelastic modulators to the first photoelastic modulator in the present invention.

A schematic diagram of the slaving of photoelastic modulator 48 to modulator 44 is provided in FIG. 2 of the drawings. The dashed lines encompass the internal components of slave modulator head 38. For the proper operation of the present invention, the junction between diode D3 and diode D6 of the Hinds International Inc. device is opened. The breaking of this junction prohibits slave head 38 from self oscillating and in effect, allows the master photoelectric modulators 44 to drive the slave photoelastic modulator directly.

Although the slave oscillator loop is disabled, slave modulator 48 still maintains the feedback necessary to control the amplitude of its piezoelectric transducer PZT1. These feedback lines enables the slave photoelastic modulator 48 to maintain retardation control independent from master photoelastic modulator 44. The RC network consisting of capacitor C1 and resistive elements R1 and R2 acts as a direct current block to zero the current waveform coming from the piezoelectric transducer/optical element. The negative half cycles of the feedback current through diode D6 provide the feedback information necessary to stabilize the voltage applied to the piezoelectric transducer PZT1.

Modifying the slave modulator head 38 will affect the calibration of its retardation control adjustment. The sensitivity of the slave modulator's retardation control increases, and the setting of this control should be approximately one half the value of the setting of the retardation control on the master modulator 44 to obtain equal drive voltages.

The remaining optics in FIG. 1 are configured as a conventional Twyman Green interferometer. A beam expander 62 is selected according to the size of the object to be examined, as well as the power available from the laser light source. A spatial pin hole filter can be inserted in front of beam expander 62 to insure a clean beam.

A first polarizing cube beam splitter 66 separates the horizontal and vertical light polarizations. The horizontal light component passes through a quarterwave plate 68 to a reference optical flat 70. The vertical component is passed through a quarterwave plate 72 to a test flat 74. Both of the separated polarizations are reflected back through their related quarterwave plate(68 to 70) which rotate each returning polarization component to enable the beam to be transmitted through the remaining optical train instead of being reflected back through the system.

A halfwave plate 76 is oriented with its fast axis at 22.5 degrees to the horizontal component. This rotates the orthogonal polarizations by 45 degrees which creates interference patterns along the X and Y axes. A second cube beam splitter 80 which receives the reflected polarizations via halfwave plate 76 and an interposed lens 82 allows a reference diode board 84 to see the intensity of the interference pattern along the X axis, while a camera 88 sees the interference pattern along the Y axis.

With the photoelastic modulators 44 and 48 turned off, an interference pattern can be observed on diode board 84 or on the image plane of camera 88. When modulators 44 and 48 are turned on the fringes of the interferogram begin to oscillate in intensity at 42 kilohertz. To the naked eye, the fringes of the interference pattern disappear.

The reference diode board 84 is formed of a Hewlett Packard 5082–4205 PIN diode and amplifier circuit. The camera used herein is a Schlumberger image dissector camera Model 658. Camera 88 acts as a computer-addressable photomultiplier tube with an address space of 4096 by 4096 pixels. The surface of the test flat 70 is mapped by sequentially comparing the phase of the signal from diode board 84 with the phase of a signal from an addressed pixel from camera 88. The phase between the signal from diode board 84 and camera 88 will vary as different pixels in the image plane of camera 88 are addressed. The value of each phase measurement is proportional to the number of wavelengths of light between the test and reference objects.

Although the invention has been described with reference to a particular embodiment thereof, it will be understood to those skilled in the art that the invention is capable of a variety of alternative embodiments within the spirit and scope of the appended claims.

What is claimed is:

1. A heterodyne type interferometer for characterizing the surface of an object comprising:
    an input light source providing a horizontally polarized light beam;
    a first quarter wave plate disposed in said light beam and having its fast axis oriented at forty five degrees from the horizontal component of said light beam;
    a first and a second photoelastic modulator each having a optical element whose refractive index is varied in response to a mechanical stress applied thereto by an associated transducer;
    said first photoelastic modulator having its optical element positioned in said light beam after said first quarter wave plate and oriented at forty five degrees from the horizontal component of said light beam;
    said second photoelastic modulator having its optical element positioned in said light beam after said first photoelastic modulator and oriented in alignment with said horizontal component of said light beam;
    said first photoelastic modulator generating a reference signal for driving its transducer and optical element at a desired frequency;
    a phase shifter for shifting the phase of said reference signal and applying the phase shifted reference signal to said second photoelastic modulator to drive its optical element at the same frequency and in phase quadrature with the optical element of said first photoelastic modulator;
    a second quarter wave plate positioned in said light beam after said second photoelastic modulator and having its fast axis oriented at forty five degrees from the horizontal component of said light beam;
    and optical means including a beam splitter positioned in said light beam after said second quarter wave plate for separating the horizontal and vertical components of said light beam and recombining said horizontal and vertical components after their reflection from a reference object and a test object respectively to establish an interference pattern indicative of the surface characteristics of said test object.

2. A heterodyne type interferometer as defined in claim 1 wherein said input light source is single mode argon ion laser.

3. A heterodyne type interferometer as defined in claim 2 wherein said reference signal has a frequency between 30 and 50 kilohertz and said transducer is a piezoelectric transducer.

4. A heterodyne type interferometer as defined in claim 3 and further comprising an image dissector camera coupled to said optical means for selectively addressing pixels of said interference pattern, and a PIN diode coupled to said optical means for determining the phase of the signal from said interference pattern.

* * * * *